(12) United States Patent
Laycock et al.

(10) Patent No.: US 7,542,273 B2
(45) Date of Patent: Jun. 2, 2009

(54) MUSIC DISPLAY AND COLLABORATION SYSTEM

(76) Inventors: Larry R. Laycock, 146 S. Pfeifferhorn Dr., Alpine, UT (US) 84004; Lisa Laycock, 146 S. Pfeifferhorn Dr., Alpine, UT (US) 84004

(*) Notice: Subject to any disclaimer, the term of this patent is extended or adjusted under 35 U.S.C. 154(b) by 335 days.

(21) Appl. No.: 11/528,167

(22) Filed: Sep. 27, 2006

(65) Prior Publication Data
US 2008/0047413 A1    Feb. 28, 2008

Related U.S. Application Data

(63) Continuation-in-part of application No. 11/510,344, filed on Aug. 25, 2006, now abandoned.

(51) Int. Cl.
*H05K 5/00* (2006.01)
*H05K 7/00* (2006.01)
(52) U.S. Cl. .................. 361/681; 361/683
(58) Field of Classification Search ............... 361/681, 361/683
See application file for complete search history.

(56) References Cited

U.S. PATENT DOCUMENTS

| | | | |
|---|---|---|---|
| 6,348,648 B1 | 2/2002 | Connick, Jr. | |
| 6,483,019 B1 | 11/2002 | Hamilton | |
| 6,845,005 B2 | 1/2005 | Shimano | |
| 7,074,999 B2 * | 7/2006 | Sitrick et al. | 84/477 R |
| 7,098,392 B2 | 8/2006 | Sitrick et al. | |
| 7,196,689 B2 | 3/2007 | Moriyama | |
| 7,298,365 B2 | 11/2007 | Moriyama | |
| 2003/0100965 A1 | 5/2003 | Sitrick et al. | |
| 2003/0110926 A1 | 6/2003 | Sitrick et al. | |
| 2003/0015037 A1 | 8/2003 | Hamilton | |
| 2004/0212588 A1 | 10/2004 | Moriyama | |
| 2005/0052835 A1 | 3/2005 | Wu et al. | |
| 2006/0145942 A1 | 7/2006 | Maata | |
| 2006/0214922 A1 | 9/2006 | Moore et al. | |
| 2006/0288842 A1 | 12/2006 | Sitrick et al. | |
| 2007/0182663 A1 * | 8/2007 | Biech | 345/1.1 |
| 2008/0060506 A1 | 3/2008 | Laycock et al. | |
| 2008/0062625 A1 | 3/2008 | Batio | |

OTHER PUBLICATIONS

Screen shots printed from website http://www.estari.com on Aug. 23, 2006 (2 Pages).

(Continued)

*Primary Examiner*—Jayprakash N Gandhi
*Assistant Examiner*—Anthony M Haughton
(74) *Attorney, Agent, or Firm*—Workman Nydegger, P.C.

(57) ABSTRACT

The present invention relates to systems for music display and collaboration. In one exemplary embodiment of the invention, a tablet computer includes a first display unit with a front surface, a display device mounted in the front surface, and a first back surface. The tablet computer also includes a second display unit with a front surface, a display device mounted in the front surface, and a back surface. Finally, the tablet computer also includes a hinging assembly coupling the first display unit to the second display unit. The hinging assembly defining an axis of rotation that allows each display unit to rotate about 360° around the axis of rotation with respect to the other display unit.

19 Claims, 4 Drawing Sheets

OTHER PUBLICATIONS

Screen shots printed form http://www.freehandssystem.com on Aug. 23, 2006 (5 pages).
Music Pad Pro TM and Music Pad Pro TM and Users Guide, copyright 2004 (pp. i-vi and 1-134).
U.S. Appl. No. 11/510,344, filed Mar. 26, 2008, Office Action.
U.S. Appl. No. 11/510,344, filed Jul. 25, 2008, Office Action Response.
U.S. Appl. No. 11/510,344, filed Sep. 4, 2008, Notice of Allowance.

* cited by examiner

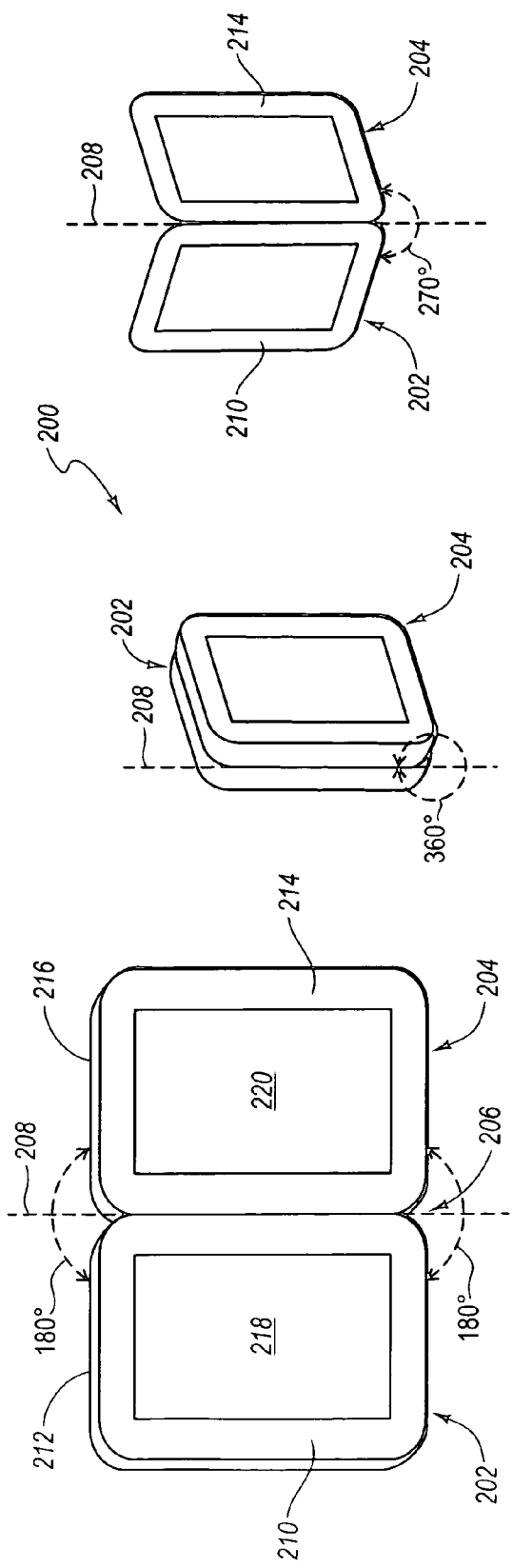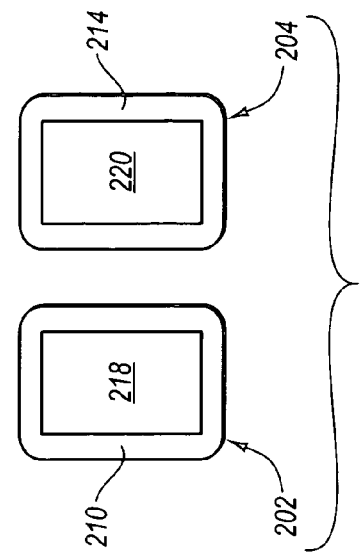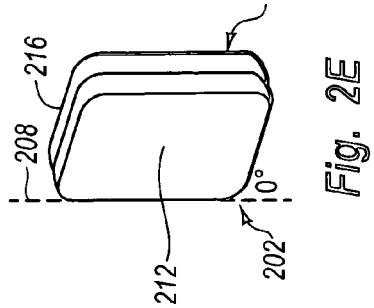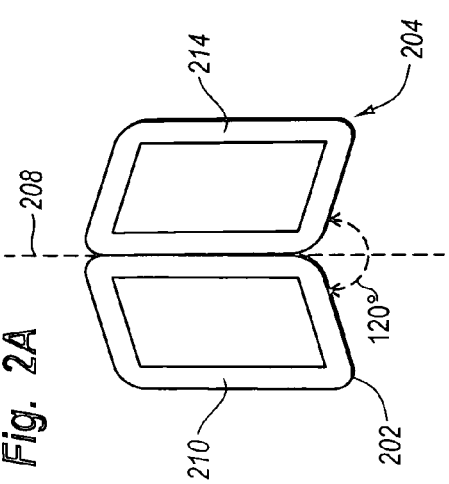

MUSIC DISPLAY AND COLLABORATION SYSTEM

RELATED APPLICATION

This application is a continuation-in-part of U.S. patent application Ser. No. 11/510,344, filed Aug. 25, 2006, and entitled "Music Display and Collaboration."

BACKGROUND OF THE INVENTION

1. The Field of the Invention

The present invention relates to systems for music display and collaboration. More particularly, embodiments of the invention relate to systems for electronically storing, displaying, and manipulating electronic sheet music and for enabling collaboration of the performance of the same.

2. Related Technology

With advances in publishing technology, musical works are being published with greater speed and efficiency. The proliferation of published sheet music, both in a traditional paper form as well as in a computer-readable electronic form, has given musicians access to an ever increasing number of musical works. The electronic publication of sheet music, and the storage of sheet music in databases accessible on computer networks and over the internet, has made it possible for musicians to access and download electronically published sheet music for use on personal computers.

The transition from practicing and performing music using paper sheet music to practicing and performing music using electronic sheet music has not been without its problems, however. One problem with electronic sheet music is that a computer is required in order to display it to the musician. Although tablet computers have been developed specifically to enable musicians to store, display, and manipulate electronic sheet music, these electronic sheet music tablet computers lack features that make for a smooth transition from paper sheet music to electronic sheet music. One problematic feature of these electronic sheet music personal computers is that they only have a single liquid crystal display/touch screen.

This single display is problematic for at least three reasons. First, a single display does not have a closed position. The lack of a closed position leaves the surface of the display vulnerable to being scratched or otherwise damaged when the tablet computer is being transported. Second, a single display does not closely model a traditional book with paper pages. A book of sheet music or of music instruction, when open, displays two paper pages simultaneously. Musicians accustomed to viewing two pages of sheet music simultaneously can find it difficult to adapt to only viewing a single page of sheet music on a single display of a tablet computer. Although current configurations allow two pages to be shown on a single display simultaneously, this is only accomplished by shrinking down the sheet or page being displayed, which can make the sheet or page difficult to see. Third, circumstances may arise during the use of an electronic sheet music tablet computer where two musicians have need to share the electronic sheet music tablet computer. When musician are not situated side by side, however, a single display can prove difficult for both musicians to view at the same time.

Another problem with current configurations of electronic sheet music tablet computers is a lack of networking hardware and software to enable each tablet computer to have audio and video communication with each other tablet computer. Likewise, wireless networking hardware and software is also lacking in current configurations. In addition, current configurations of electronic sheet music tablet computers lack built in microphones, speakers, and cameras, with accompanying software.

BRIEF DESCRIPTION OF THE DRAWINGS

To further clarify various aspects of exemplary embodiments of the present invention, a more particular description of the invention will be rendered by reference to specific exemplary embodiments thereof which are illustrated in the appended drawings. It is appreciated that these drawings depict only exemplary embodiments of the invention and are therefore not to be considered limiting of its scope. The drawings are not drawn to scale. The invention will be described and explained with additional specificity and detail through the use of the accompanying drawings in which:

FIGS. 2A-2F illustrate exemplary configurations for an exemplary electronic sheet music tablet computer with two display units;

DETAILED DESCRIPTION OF EXEMPLARY EMBODIMENTS OF THE INVENTION

I. An Exemplary Tablet Computer

Figure 1:
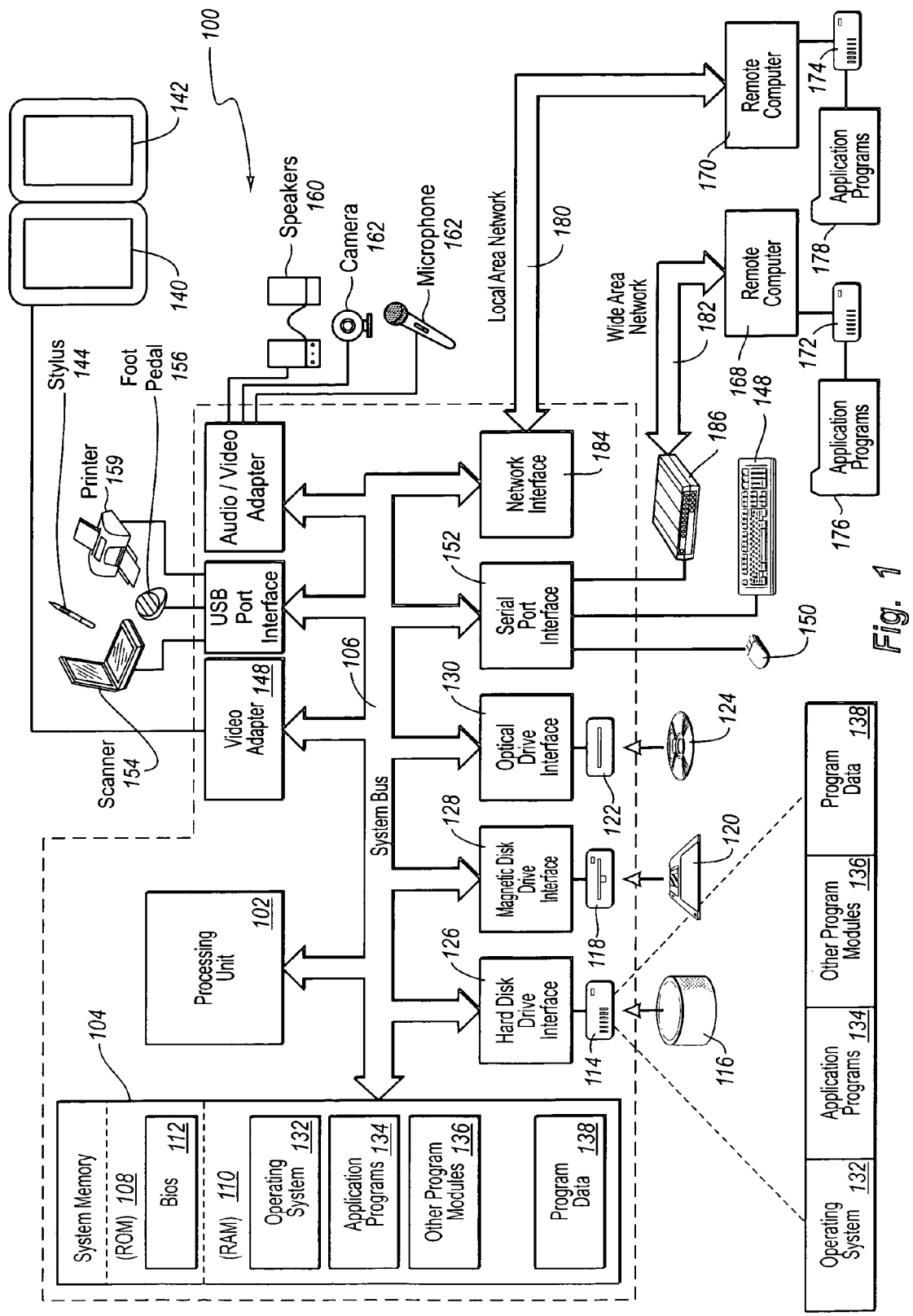
FIG. 1 is a block diagram that discloses the architecture of exemplary tablet computer.

FIG. 1A is a block diagram illustrating the architecture of an exemplary tablet computer 100 for electronically storing, displaying, and manipulating electronic sheet music and for enabling collaboration of the performance of the same. Tablet computer 100 is powered either by an AC power source or a battery (not shown). The tablet computer 100 includes a processing unit 102, a system memory 104, and a system bus 106 that couples various system components including the system memory 104 to the processing unit 102.

The system bus 106 may be any of several types of bus structures including a memory bus or memory controller, a peripheral bus, and a local bus using any of a variety of bus architectures. The system memory includes read only memory (ROM) 108 and random access memory (RAM) 110. A basic input/output system (BIOS) 112, containing the basic routines that help transfer information between elements within the tablet computer 100, such as during start-up, may be stored in ROM 108.

The tablet computer 100 may also include a magnetic hard disk drive 114 for reading from and writing to a magnetic hard disk 116, a magnetic disk drive 118 for reading from or writing to a removable magnetic disk 120, and an optical disk drive 122 for reading from or writing to removable optical disk 124 such as a CD-ROM or other optical media. The magnetic hard disk drive 114, magnetic disk drive 118, and optical disk drive 122 are connected to the system bus 106 by a hard disk drive interface 126, a magnetic disk drive-interface 128, and an optical drive interface 130, respectively. The drives and their associated computer-readable media provide nonvolatile storage of computer-executable instructions, data structures, program modules and other data for the tablet computer 100. Although the exemplary environment described herein employs a magnetic hard disk 116, a removable magnetic disk 120 and a removable optical disk 124, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 116, magnetic disk 120, optical disk 124, ROM 108 or RAM 110, including an operating system 132, one or more application programs 134, other program modules 136, and program data 138. The application programs 134 include one or more application programs which enable a user to electronically store, display, and manipulate electronic sheet music. The program data 138 includes electronic sheet music. Likewise, the application programs 134 include one or more application programs which enable a user to collaborate in the electronic storing, displaying, and manipulating of electronic sheet music, and the performance of the same.

A user may enter commands and information into the computer through display devices 140 and 142. Display devices 140 and 142 are liquid crystal displays integrated with touch screens. Display devices 140 and 142 are capable of detecting handwritten input made by a stylus 144. Alternatively, display devices 140 and 142 can be configured to detect the touch of a user's fingers (not shown). Display devices 140 and 142 can be liquid crystal displays integrated with touch screens commonly found in tablet computers, or any other type of display devices capable of receiving input through the use of a stylus or finger. The display devices 140 and 142 are also connected to system bus 106 via an interface, such as video adapter 146. Alternatively, display device 140 can be connected to one tablet computer, and display device 142 can be connected to another tablet computer, where each tablet computer includes all of the hardware and software associated with tablet computer 100. This particular configuration will be discussed in greater detail below in conjunction with the discussion of FIGS. 3A and 3B.

A user may also enter commands and information into the tablet computer 100 through a keyboard 148, a pointing device 150, or other input devices (not shown), such as a joy stick, game pad, satellite dish, or the like. These and other input devices are often connected to the processing unit 102 through a serial port interface 152 coupled to system bus 106. Alternatively, the input devices may be connected by other interfaces, such as a parallel port, a game port, or a Firewire port. Likewise, a user may enter commands and information into the tablet computer 100 through a scanner 154 or a foot pedal 156. Scanner 154 can be used to scan paper sheet music and convert it into electronic sheet music, which can then be stored as program data 138 and displayed on display devices 140 and 142 through the use of one or more application programs 134 specifically configured to handle the storage, display, and manipulation of electronic sheet music. Foot pedal 156 can be used, for example, to electronically turn the page of electronic sheet music displayed on display devices 140 and 142. These and other input/output devices are often connected to the processing unit 102 through a universal serial bus (USB) port interface 158. One example of an output device that can be connected through USB port interface 158 is printer 159. Printer 159 can be used to print out sheet music that has been altered by a user on tablet computer 100. Tablet computer 100 also includes other input and output devices, such as one or more speakers 160, camera 162, and microphone 164. These devices are also connected to system bus 106 via an interface, such as an audio/video adapter 166.

The tablet computer 100 may operate in a networked environment using logical connections to one or more remote computers, such as remote computers 168 and 170. Remote computers 168 and 170 may each be another tablet computer similar to tablet computer 100, or could be a personal computer, a server, a router, a network PC, a peer device, or other common network node, and typically include many or all of the elements described above relative to the tablet computer 100, although only memory storage devices 172 and 174 and their associated application programs 176 and 178 have been illustrated in FIG. 1. The logical connections depicted in FIG. 1 include a local area network (LAN) 180 and a wide area network (WAN) 182 that are presented here by way of example and not limitation. Such networking environments are commonplace in office-wide or enterprise-wide computer networks, intranets and the Internet.

When used in a LAN networking environment, the tablet computer 100 is connected to the local network 180 through a network interface or adapter 184. When used in a WAN networking environment, the tablet computer 100 may include a wireless link 186, a modem, or other means for establishing communications over the wide area network 182, such as the Internet. The wireless link 186, which may be internal or external, can be connected to the system bus 106 via the serial port interface 152, or alternatively, via the network interface 184. In a networked environment, program modules depicted relative to the tablet computer 100, or portions thereof, may be stored in the remote memory storage device. It will be appreciated that the network connections shown are exemplary and other means of establishing communications over wide area network 182 may be used.

While FIG. 1 illustrates an example of a tablet computer system that may implement the principles of the present invention, any of a wide variety of tablet computer systems may implement the features of the present invention with suitable software. In the description and in the claims, a "tablet computer" is defined broadly as any hardware component or components that are capable of using software to perform one or more functions and receive input through a display device. Examples of tablet computers include certain desktop computers, laptop computers, tablet PCs, and Personal Digital Assistants (PDAs), or any other computer that has processing capability and a display device capable of receiving input.

II. Exemplary Tablet Computer Display Configurations

The exemplary tablet computer 100 of FIG. 1 is illustrated as having two display devices: display device 140 and display device 142. Greater details regarding these display devices is illustrated in the exemplary tablet computer display configurations of FIGS. 2A-2F. Each of FIGS. 2A-2F show an exemplary tablet computer 200 comprising a first display unit 202, a second display unit 204, and a hinging assembly 206 which couples first display unit 202 to second display unit 204.

Hinging assembly 206 connects first display unit 202 to second display unit 204. Hinging assembly 206 defines an axis of rotation 208 around which each display unit can rotate about 360° with respect to the other display unit: Hinging assembly 206 can be any type of apparatus that allows each display unit to rotate about 360° around axis of rotation 208 with respect to the other display unit. By way of example, and not limitation, hinging assembly 206 can comprise a triple hinge, a fabric strap, or a flexible piece of plastic. Hinging assembly 206 must also allow first display unit 202 and second display unit 204 to be uncoupled in the event that a musician desires to use first display unit 202 and second display unit 204 independently of one another. Therefore, hinging assembly 206 must also allow for simple uncoupling of first display unit 202 and second display unit 204. This can be accomplished, for example, by fastening hinging assembly 206 to one or both of first and second display units 202 and 204 using a fastener or adhesive which is easily unfastened, such as snap, a zipper, Velcro, a lace, or similar fastener. These fasteners are given by way of example and not by way of limitation, and any other fastener capable of being easily unfastened can be used to attache hinging assembly to one or both of first and second display units 202 and 204.

First display unit 202 includes a front surface 210 and a back surface 212. Likewise, second display unit 204 includes a front surface 214 and a back surface 216. First display unit 200 includes a display device 218 mounted in front surface 210. Display device 218 corresponds to display device 140 of FIG. 1. Second display unit 204 includes a display device 220 mounted in front surface 214. Display device 220 corresponds to display device 142 of FIG. 1.

Exemplary tablet computer 200 is configured to allow for various open positions. For example, FIG. 2A illustrates first display unit 202 rotated about 180° around axis of rotation 308 with respect to second display unit 204. In this open position, tablet computer 200 can be placed on a standard music stand (not shown) and be used to display two full sheets of electronic sheet music to one or more musicians who are positioned side-by-side facing tablet computer 200.

Another exemplary open position for tablet computer 200 is illustrated in FIG. 2B. FIG. 2B illustrates tablet computer 200 with front surface 210 of first display unit 202 rotated about 360° around axis of rotation 308 with respect to front surface 214 of second display unit 204. In this open position, tablet computer 200 can be placed on a table or other level surface (not shown). Two musicians who are facing one another can place tablet computer 200 between themselves in the open position of FIG. 2B and thereby, tablet computer 200 can be used simultaneously by both musicians. This open position would also allow a musician to place tablet computer 200 on a music stand (not shown) that is not wide enough to support tablet computer 200 in the open position of FIG. 2A.

Yet another exemplary open position for tablet computer 200 is illustrated in FIG. 2C. FIG. 2C illustrates tablet computer 200 with front surface 210 of first display unit 202 rotated about 270° around axis of rotation 308 with respect to front surface 214 of second display unit 204. In this open position, tablet computer 200 can be placed on a table or other level surface (not shown) without the support of a music stand or other supporting structure. This position also allows for two musicians who are positioned at adjoining sides of a rectangular table to each face one of the display units straight on.

A final exemplary open position for tablet computer 200 is illustrated in FIG. 2D. FIG. 2D illustrates tablet computer 200 with front surface 210 of first display unit 202 rotated about 120° around axis of rotation 308 with respect to front surface 214 of second display unit 204. In this open position, as with the open position of FIG. 2C, tablet computer 200 can be placed on a table or other level surface (not shown) without the support of a music stand or other supporting device.

In addition, tablet computer 200 is also configured to allow for a closed position. FIG. 2E illustrates tablet computer 200 with first display unit 202 rotated about 0° around axis of rotation 308 with respect to second display unit 204. In this closed position, front surface 210 (not shown) of first display unit 202 is facing and roughly parallel to front surface 214 (not shown) of second display unit 204. At the same time, back surface 212 of first display unit 202 is roughly parallel to back surface 216 of second display unit 204. This closed configuration protects front display sides 210 and 214, and more specifically display devices 218 and 220, of the display units 202 and 204 from being scratched or otherwise damaged when exemplary tablet computer 200 is being transported.

Finally, tablet computer 200 is also configured to be used by two musicians who are not in close physical proximity to one another. In addition to coupling first display unit 202 to second display unit 204, hinging assembly 206 of tablet computer 200 also allows for first display unit 202 to be uncoupled from second display unit 204, as illustrated in FIG. 2F. This uncoupled configuration allows two musicians who are not positioned in close physical proximity to one another to each view one of the display units straight on and use other features of each display unit. For example, if two musician need to perform on opposite side of a room, the detached position of FIG. 2F allows each musician to use one of first or second display unit 202 and 204 in their respective performance locations. The exemplary configuration of FIG. 2F will be discussed in greater detail below in conjunction with the discussion of FIG. 3B.

III. An Exemplary Tablet Computer Display Configuration

Figure 3A:
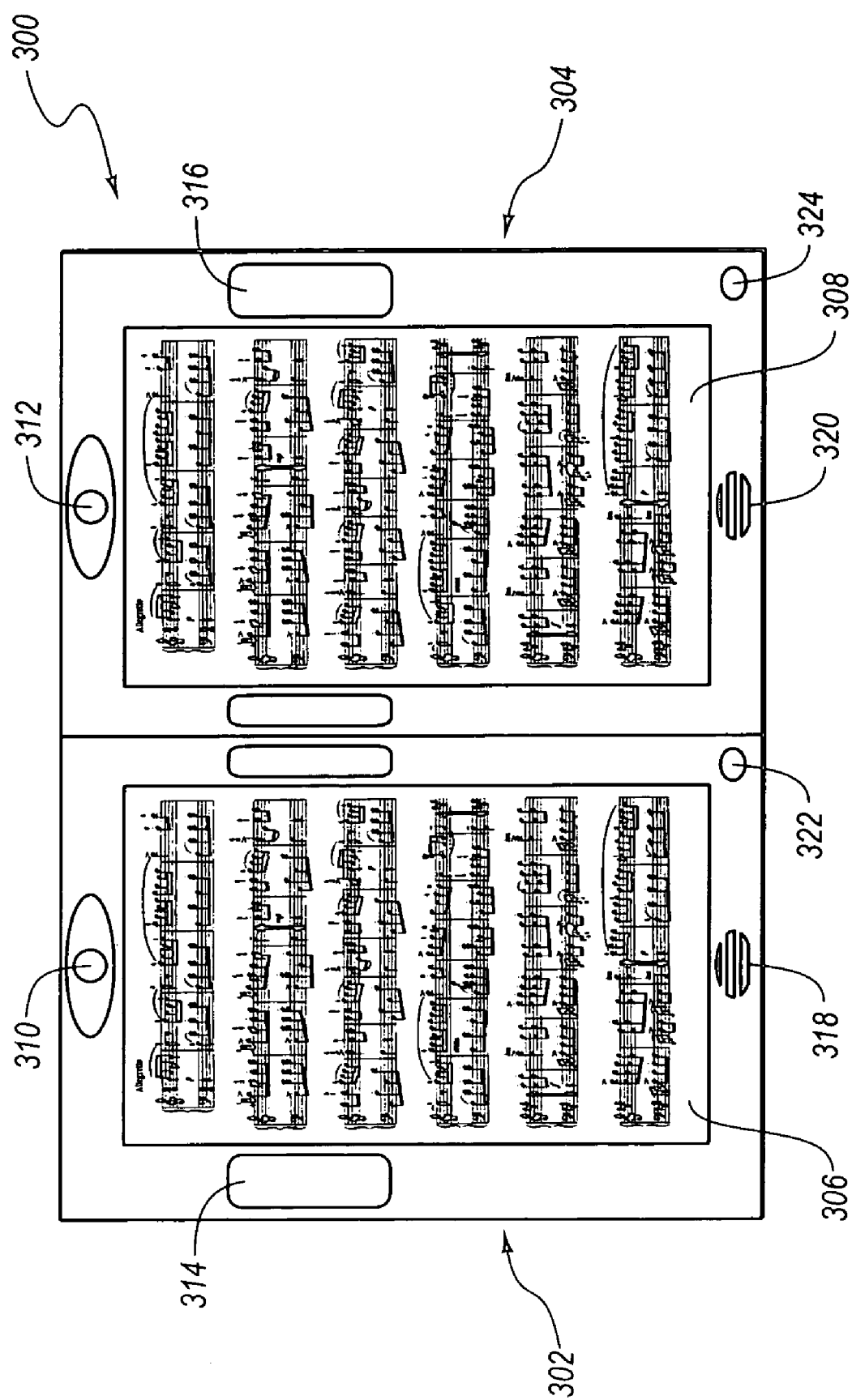
FIG. 3A illustrates various aspects of one configuration of an exemplary electronic sheet music tablet computer.

The exemplary tablet computer 200 of FIG. 2 can be further described with reference to FIGS. 3A and 3B. FIG. 3A illustrates one configuration of an exemplary tablet computer 300 that is capable of electronically storing, displaying, and manipulating electronic sheet music and also capable of enabling collaboration of the performance of electronic sheet music between musicians.

Exemplary tablet computer 300 includes a first display unit 302 coupled to a second display unit 304. As illustrated in FIG. 3A, each display unit of tablet computer 300 is capable of functioning independently of the other display unit. Likewise, each display unit is capable of functioning in conjunction with the other display unit, which is made possible either through a hardwired connection (not shown) or a wireless connection (not shown) between the two display units 302 and 304. First display unit 302 includes a display device 306 capable of displaying electronic sheet music and receiving input from a user. Second display unit 304 also includes a display device 308 capable of displaying electronic sheet music and receiving input from a user.

When display units 302 and 304 are functioning in conjunction with each other, the music displayed on display devices 306 and 308 can be identical or can be two contiguous sheets of music from the same musical piece. For example, if the tablet computer is being used by two musicians sitting across a table from one another with the tablet computer in between, and one musician makes a notation to a sheet of electronic music displayed on display unit 302, the same notation will appear on the identical sheet displayed on the other display unit 304. Alternatively, the musician or musicians using the tablet computer can have sheet music from two entirely different musical pieces on each of the display devices 306 and 308.

As discussed in conjunction with FIG. 1, display devices 306 and 308 can be liquid crystal displays integrated with touch screens capable of detecting handwritten input made by a stylus (not shown) or, alternatively, by a musician's fingers (not shown). Besides being capable of displaying electronic sheet music, display devices 306 and 306 are capable of display high resolution graphics, video, and text. Therefore, various software applications, besides software applications for storing, displaying, and manipulating electronic sheet music, can be loaded onto display units 302 and 304 and a musician can interact with these software applications through display devices 306 and 308.

First display unit 302 also includes a camera 310 that is built into display unit 302. Camera 310 is configured to take still digital pictures or digital video. Display unit 302 also includes software (not shown) for controlling camera 310, including, but not limited to turning camera 310 on or off, zooming in or out with camera 310, and transmitting or saving pictures or video taken by camera 310. Second display unit 304 also includes a similar camera 312 and similar software (not shown) for controlling camera 312. Cameras 310 and 312 can be used to record video or pictures to view later, or cameras 310 and 312 can be used to record video or pictures to be transmitted immediately (in real-time) to another similar display unit or tablet computer, as discussed in greater detail below in conjunction with FIG. 3B.

First display unit 302 includes speakers 314 and second display unit 304 includes speakers 316. In addition, first display unit 302 includes microphone 318 and second display unit 304 includes microphone 320. When display units 302 and 304 are functioning in conjunction with each other, speakers 314 and 316 can be playing identical audio output and the microphones 318 and 320 can be receiving identical audio input. When display units 302 and 304 are functioning independently of each other, however, speakers 314 and 316 can be playing different audio output and microphones 318 and 320 can be receiving different audio input. Speakers 314 and 316 and microphones 318 and 320 can be used to play and record audio all types of audio, whether it be voice, instrumental, or other audio. For example, microphones 318 and 320 can be used to record music played by a musician, and speakers 314 and 316 can be used to play the recorded music. Likewise, speakers 314 and 316 and microphones 318 and 320 can be used to carry on a two way conversation between first display unit 302 and second display unit 304, or another display unit similarly configured, as discussed in greater detail below in conjunction with FIG. 3B.

Finally, display unit 302 includes power button 322 and second display unit 304 includes power button 324. When display units 302 and 304 are functioning in conjunction with each other, either power button can function to turn both display units on or off. On the other hand, when display units 302 and 304 are functioning independently of each other, power button 322 is used to turn first display unit 302 on and off, and power button 324 is used to turn second display unit 304 on or off.

Figure 3B:
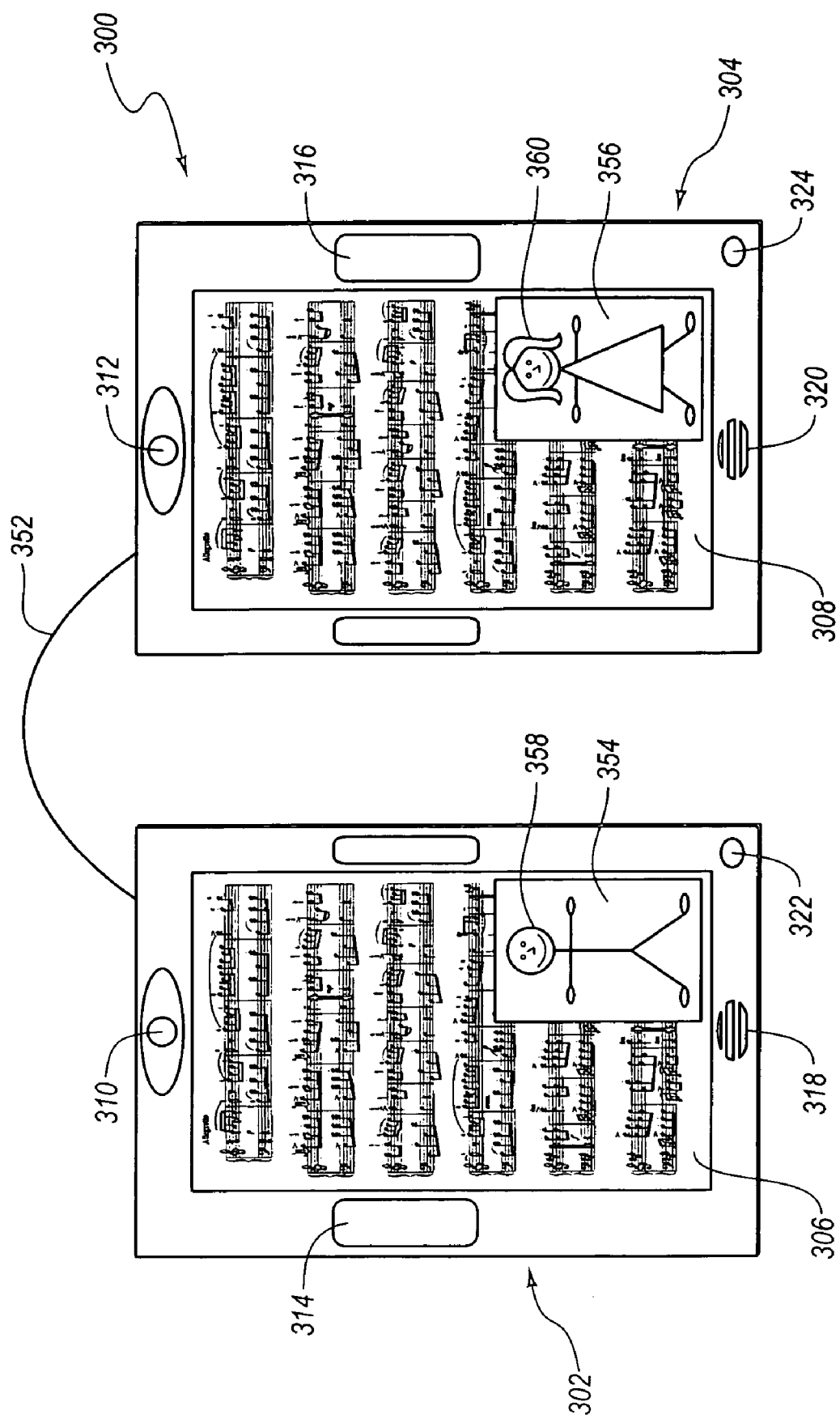
FIG. 3B illustrates the collaboration functionality of the exemplary electronic sheet music tablet computer of FIG. 3A.

Turning now to FIG. 3B, the tablet computer of FIG. 3A is illustrated in another exemplary configuration of tablet computer 300. Unlike the configuration illustrated in FIG. 3A where first display unit 302 is coupled to second display unit 304, in the configuration illustrated in FIG. 3B, first display unit 302 is uncoupled from second display unit 304. Although first display unit 302 is uncoupled from second display unit 304 in FIG. 3B, a wireless connection 352 enables each display unit to function in conjunction with the other display unit. Alternatively, just as in FIG. 3A, the tablet computer 300 as configuration in FIG. 3B is capable of functioning independently from second display unit 304.

The ability of each of first and second display units 302 and 304 to function independently of each other allows the tablet computer 300 to be used simultaneous by two or more musicians who are not in close physical proximity to one another. The features of the exemplary tablet computer 300 also enable collaboration of the performance of electronic sheet music between musicians.

First display unit 302 includes a window 354 that can be displayed on display device 306. First display unit 302 can be configured to receive a real-time video stream across wireless connection 352 and display the video stream in window 354. Likewise, first display unit 302 can use camera 310 to record a video stream and transmit the video stream in real-time across wireless connection 352. Second display unit 304 is also capable of receiving real-time video over wireless connection 352 and displaying the real-time video in a window 356 on display device 308. Likewise, second display unit 304 can use camera 312 to record a video stream and transmit the video stream in real-time across wireless connection 352.

The capability of each display unit to both record/transmit real-time video and receive/display real-time video enables collaboration between two musicians, each of which has possession of a display unit. For example, if a first musician 360 from electronic sheet music displayed on first display unit 302 on one floor of a building, and a second musician 358 is performing from electronic sheet music displayed on second display, unit 304 on another floor of the same building, first musician 360 can watch second musician 358 perform in window 354 on first display unit 302, and second musician 358 can watch first musician 360 perform in window 356 on second display unit 304. Depending on the strength of the wireless connection, two musicians can use first and second display units 302 and 304 to collaborate over distances ranging from across a room to across the universe. Although windows 354 and 356 are shown as occupying only a portion of viewing area of display devices 306 and 308, it should be noted that windows 354 and 356 could occupy the entire viewing area of display devices 306 and 308.

First display unit 302 and second display unit 304 are also capable of audio communication across wireless connection 352. First display unit 302 can use built in microphone 210 to record voice or other audio and transmit a real-time audio stream across wireless connection 352. Likewise, first display unit 302 can receive a real-time audio stream over wireless connection 352 and play the audio stream on speakers 314. Second display unit 304 is also capable of recording and transmitting real-time audio, as well as receiving and playing real-time audio, in a similar fashion.

The capability of each display unit to both record/transmit real-time audio and receive/display real-time audio enables collaboration in a similar fashion as discussed above using real-time video. In addition, each of first and second display units 302 and 304 is capable of recording audio and video simultaneously, and transmitting synchronized audio/video over wireless connection 252. Likewise each of first and second display units 302 and 304 is capable of receiving synchronized audio/video and displaying the video in its respective display and playing the audio on its respective speakers, all the while maintaining the synchronization between the audio and video. This real-time synchronized audio/video functionality enables even greater level of collaboration between musicians. Additionally, real-time synchronized audio/video functionality can be used, for example, by a music instructor to give a music lesson to a student from a location remote from the student.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tablet computer comprising:
 a first display unit comprising:
  a first front surface;

a first display device mounted in the first front surface, the first display device capable of displaying electronic sheet music; and
a first back surface;
a second display unit comprising:
a second front surface;
a second display device mounted in the second front surface, the second display device capable of displaying electronic sheet music; and
a second back surface; and
a hinging assembly coupling the first display unit to the second display unit, the hinging assembly defining an axis of rotation that allows each display unit to rotate about 360° around the axis of rotation with respect to the other display unit; and
a first setting wherein the first display unit and the second display unit operate in conjunction with one another when attached; and
a second setting wherein the first display unit operates completely independent from the second display unit and the second display unit operates completely independent from the first display unit when detached from one another.

2. The tablet computer as recited in claim 1, further comprising a closed configuration where the first front surface is rotated about 0° around the axis of rotation with respect to the second front surface and the first front surface is adjacent to the second front surface.

3. The tablet computer as recited in claim 1, further comprising an open configuration where the first front surface is rotated about 360° around the axis of rotation with respect to the second front surface and the first back surface is adjacent to the second back surface.

4. The tablet computer as recited in claim 1, further comprising an open configuration where the first front surface is rotated between about 0° and about 180° around the axis of rotation with respect to the second front surface.

5. The tablet computer as recited in claim 1, further comprising an open configuration where the first front surface is rotated between about 180° and about 360° around the axis of rotation with respect to the second front surface.

6. The tablet computer as recited in claim 1, further comprising a wireless connection that facilitates communication between the first display unit and the second display unit.

7. The tablet computer as recited in claim 6, wherein the hinging assembly is configured to allow the first display unit to be uncoupled from the second display unit.

8. A tablet computer comprising:
a first display unit;
a first display device coupled to the first display unit, the first display device capable of displaying electronic sheet music;
a first video camera coupled to the first display unit;
a first video display window configured to display video in real-time on a portion of the first display device;
a first speaker coupled to the first display unit;
a first microphone coupled to the first display unit;
a second display unit;
a second display device coupled to the second display unit, the second display device capable of displaying electronic sheet music;
a second video camera coupled to the second display unit;
a second video display window configured to display video in real-time on a portion of the second display device;
a second speaker coupled to the second display unit;
a second microphone coupled to the second display unit;
a hinging assembly coupling the first display unit to the second display unit, the hinging assembly having an axis of rotation which allows each display unit to rotate about 360° around the axis of rotation with respect to the other display unit;
a first setting wherein the first display unit and the second display unit operate in conjunction with one another when attached; and
a second setting wherein the first display unit operates completely independent from the second display unit and the second display unit operates completely independent from the first display unit when detached from one another.

9. The tablet computer as recited in claim 8, further comprising a wireless connection that facilitates communication between the first display unit and the second display unit.

10. The tablet computer as recited in claim 9, wherein the hinging assembly is configured to allow the first display unit to be uncoupled from the second display unit.

11. The tablet computer as recited in claim 10, wherein the first display unit is configured to capture video through the first video camera and transmit the video in real-time over the wireless connection to the second video display window.

12. The tablet computer as recited in claim 10, wherein the first display unit is configured to capture audio through the first microphone and transmit the audio in real-time over the wireless connection to the second display unit which is configured to play the audio in real-time on the second speaker.

13. The tablet computer as recited in claim 10, wherein the first display unit is configured to capture video through the first video camera and concurrently capture audio through the first microphone and transmit the video and audio in real-time over the wireless connection to the second video display window and play the audio in real-time on the second speaker.

14. A tablet computer for electronically storing, displaying, and manipulating sheet music and video conferencing, the tablet computer comprising:
a first display unit comprising:
a first display device coupled to the first display unit; the first display device capable of displaying electronic sheet music;
a first video camera coupled to the first display unit;
a first video display window configured to display video in real-time on a portion of the first display device;
a first speaker coupled to the first display unit; and
a first microphone coupled to the first display unit;
a second display unit comprising:
a second display device coupled to the second display unit, the second display device capable of displaying electronic sheet music;
a second video camera coupled to the second display unit;
a second video display window configured to display video in real-time on a portion of the second display device;
a second speaker coupled to the second display unit; and
a second microphone coupled to the second display unit;
a hinging assembly coupling the first display unit to the second display unit, the hinging assembly having an axis of rotation that allows each display unit to rotate about 360° around the axis of rotation with respect to the other display unit, wherein the hinging assembly coupling is configured to enable the first and second display units to be selectively hingedly coupled together or to be selectively detached from one another;

a wireless connection that facilitates communication between the first display unit and the second display unit;

a first setting wherein the first display unit and the second display unit operate in conjunction with one another when attached; and a second setting wherein the first display unit operates completely independent from the second display unit and the second display unit operates completely independent from the first display unit when detached from one another.

15. The tablet computer as recited in claim 14, wherein the hinging assembly is configured to allow the first display unit to be uncoupled from the second display unit.

16. The tablet computer as recited in claim 15, wherein the first display unit is configured to capture video through the first video camera and transmit the video in real-time over the wireless connection to the second video display window.

17. The tablet computer as recited in claim 15, wherein the first display unit is configured to capture audio through the first microphone and transmit the audio in real-time over the wireless connection to the second display unit which is configured to play the audio in real-time on the second speaker.

18. The tablet computer as recited in claim 15, wherein the first display unit is configured to capture video through the first video camera and concurrently capture audio through the first microphone and transmit the video and audio in real-time over the wireless connection to the second video display window and play the audio in real-time on the second speaker.

19. The tablet computer as recited in claim 18, wherein the second display unit is configured to capture video through the second video camera and concurrently capture audio through the second microphone and transmit the video and audio in real-time over the wireless connection to the first video display window and play the audio in real-time on the first speaker.

* * * * *